(12) United States Patent
Tagashira et al.

(10) Patent No.: US 11,226,049 B2
(45) Date of Patent: Jan. 18, 2022

(54) FLUID SUPPLY SYSTEM

(71) Applicant: FUJIKIN INCORPORATED, Osaka (JP)

(72) Inventors: Naoto Tagashira, Osaka (JP); Kouji Tsutsumi, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/309,070

(22) PCT Filed: Oct. 3, 2019

(86) PCT No.: PCT/JP2019/039159
§ 371 (c)(1),
(2) Date: Apr. 20, 2021

(87) PCT Pub. No.: WO2020/090347
PCT Pub. Date: May 7, 2020

(65) Prior Publication Data
US 2021/0317924 A1    Oct. 14, 2021

(30) Foreign Application Priority Data
Oct. 31, 2018    (JP) .............................. JP2018-205600

(51) Int. Cl.
*F16K 27/08*    (2006.01)
*F16K 27/00*    (2006.01)

(52) U.S. Cl.
CPC .................................... *F16K 27/00* (2013.01)

(58) Field of Classification Search
CPC ................... F16K 27/00; F16K 27/003; Y10T 137/87885; F15B 13/0817
See application file for complete search history.

(56) References Cited

U.S. PATENT DOCUMENTS 6,109,303 A *   8/2000  Itafuji ................... F16K 27/003
                                                    137/269
7,562,677 B2 *  7/2009  Perusek .............. F15B 13/0825
                                                    137/884
(Continued)

FOREIGN PATENT DOCUMENTS

EP          1895214 A1      5/2008
JP       2013127312 A       6/2013
(Continued)

OTHER PUBLICATIONS

International Search Report and Written Opinion in corresponding International Application No. PCT/JP2019/039159 dated Dec. 24, 2019.

*Primary Examiner* — Reinaldo Sanchez-Medina
(74) *Attorney, Agent, or Firm* — Champlin & Koehler, P.A.

(57) ABSTRACT

A fluid supply system includes: a coupling manifold disposed in parallel to mutually facing end portions of the multiple-unit manifolds that are adjacent to each other; a first fluid control device connecting one of the end portions of the multiple-unit manifolds that are adjacent to each other to the coupling manifold; and a second fluid control device connecting the other one of the end portions of the multiple-unit manifolds that are adjacent to each other to the coupling manifold, in which the coupling manifold has a communication passage that establishes communication of combined flow passages of the multiple-unit manifolds that are adjacent to each other via the first and second fluid control devices.

9 Claims, 4 Drawing Sheets

(56) References Cited

U.S. PATENT DOCUMENTS

| | | | |
|---|---|---|---|
| 8,042,573 B2* | 10/2011 | Tokuda | F15B 13/0817 137/884 |
| 2006/0005891 A1* | 1/2006 | Doyle | F17D 1/04 137/884 |
| 2008/0302426 A1* | 12/2008 | Mulligan | F16K 27/003 137/271 |
| 2009/0183792 A1 | 7/2009 | Tokuda et al. | |
| 2015/0075660 A1* | 3/2015 | Inada | F15B 13/0817 137/884 |
| 2018/0246532 A1* | 8/2018 | Nakamura | G05D 7/0635 |

FOREIGN PATENT DOCUMENTS

| | | |
|---|---|---|
| JP | 2016205595 A | 12/2016 |
| JP | 2016223533 A | 12/2016 |
| WO | 2007017937 A1 | 2/2007 |
| WO | 2007032147 A1 | 3/2007 |

\* cited by examiner

FLUID SUPPLY SYSTEM

CROSS REFERENCE TO RELATED APPLICATION (S)

This application is a Section 371 National Stage Application of International Application No. PCT/JP2019/039159, filed Oct. 3, 2019 and published as WO 2020/090347 A1 on May 7, 2020, and further claims priority to Japanese Patent Application Ser. No. 2018-205600, filed Oct. 31, 2018.

TECHNICAL FIELD

The present invention relates to a fluid supply system and particularly to a fluid supply system in which a plurality of multiple-unit manifolds with a plurality of fluid control devices connected are disposed in series in a flowing direction of a flow in a combined flow passage.

BACKGROUND ART

FIG. 4 in Patent Document 1 discloses a fluid supply system in which two manifolds with fluid control devices connected are disposed in parallel. The two manifolds disposed in parallel are coupled to each other with short pipes projecting from end portions thereof welded to each other, thereby establishing communication in a mutually combined flow passage.

PRIOR ART DOCUMENT

Patent Document

Patent Document 1: Japanese Patent Laid-Open No. 2013-127312

SUMMARY OF THE INVENTION

Problems to be Solved by the Invention

In the case of Patent Document 1 described above, there is a concern of inner surface burning caused inside the short pipes and inside the combined flow passage of the manifolds due to welding since the short pipes formed at the manifolds are welded. Since there is a concern that particles may be mixed in a fluid flowing through the flow passage due to the inner surface burning, it is necessary to remove the inner surface burning. However, it is not possible to access the inner circumferential surfaces of the short pipes and the manifolds after the welding, and it is thus difficult to remove the inner surface burning.

In particular, gas supply systems for semiconductor manufacturing devices tend to be highly integrated by a plurality of multiple-unit manifolds, which enable multiple different types of gas to be switched for supply, are disposed in series in a flowing direction of fluids in combined flow passages. In the case of Patent Document 1 described above, since it is not possible to connect the manifolds in series, and the spaces of the projecting short pipes are wasted, there is a concern that integration may be prevented.

Further, another problem is that the multiple-unit manifolds to which a large number of fluid lines can be connected are more different to produce and require more production costs as the number of manifolds increases.

Embodiments of the present invention, which contemplate such problems, provide a reliable fluid supply system, in which a plurality of multiple-unit manifolds are disposed in series to achieve high integration at reduced production costs, which curbs generation of particles.

Means for Solving the Problems

The present invention can be realized in the following aspects.

A fluid supply system according to an aspect is a fluid supply system in which a plurality of multiple-unit manifolds with a plurality of fluid lines connected are disposed in series in an arrangement direction of the fluid lines, including: a coupling manifold disposed in parallel to mutually facing end portions of the multiple-unit manifolds that are adjacent to each other; a first fluid control device connecting one of the end portions of the multiple-unit manifolds that are adjacent to each other to the coupling manifold; and a second fluid control device connecting the other one of the end portions of the multiple-unit manifolds that are adjacent to each other to the coupling manifold, in which the coupling manifold has a communication passage that establishes communication of combined flow passages of the multiple-unit manifolds that are adjacent to each other via the first and second fluid control devices.

Also, in the aforementioned fluid supply system according to the aspect, each of the first and second fluid control devices includes first and second flow passages caused to communicate with each of the combined flow passages of the multiple-unit manifolds that are adjacent to each other via the communication passage, and a third flow passage causing each of the fluid lines to communicate with the each of the combined flow passages of the multiple-unit manifolds that are adjacent to each other.

Moreover, in the aforementioned fluid supply system according to the aspect, each of the first and second fluid control devices is a three-way valve that is able to open the third flow passage in response to switching while the first and second flow passages are kept constantly opened.

Also, the aforementioned fluid supply system according to the aspect further includes: a block joint, which is disposed with a clearance away from the multiple-unit manifolds that are adjacent to each other in an extension direction of the fluid lines, the first and second fluid control devices being connected to the block joint along with the multiple-unit manifolds and the coupling manifold, and the coupling manifold is disposed in the clearance.

Advantageous Effects of the Invention

According to the aforementioned aspects of the present invention, it is possible to provide a reliable fluid supply system, in which a plurality of multiple-unit manifolds are disposed in series to achieve high integration at reduced production costs, which curbs generation of particles.

The present summary is provided only by way of example, and not limitation. Other aspects of the present invention will be appreciated in view of the entirety of the present disclosure, including the entire text, claims and accompanying figures.

Figure 1:
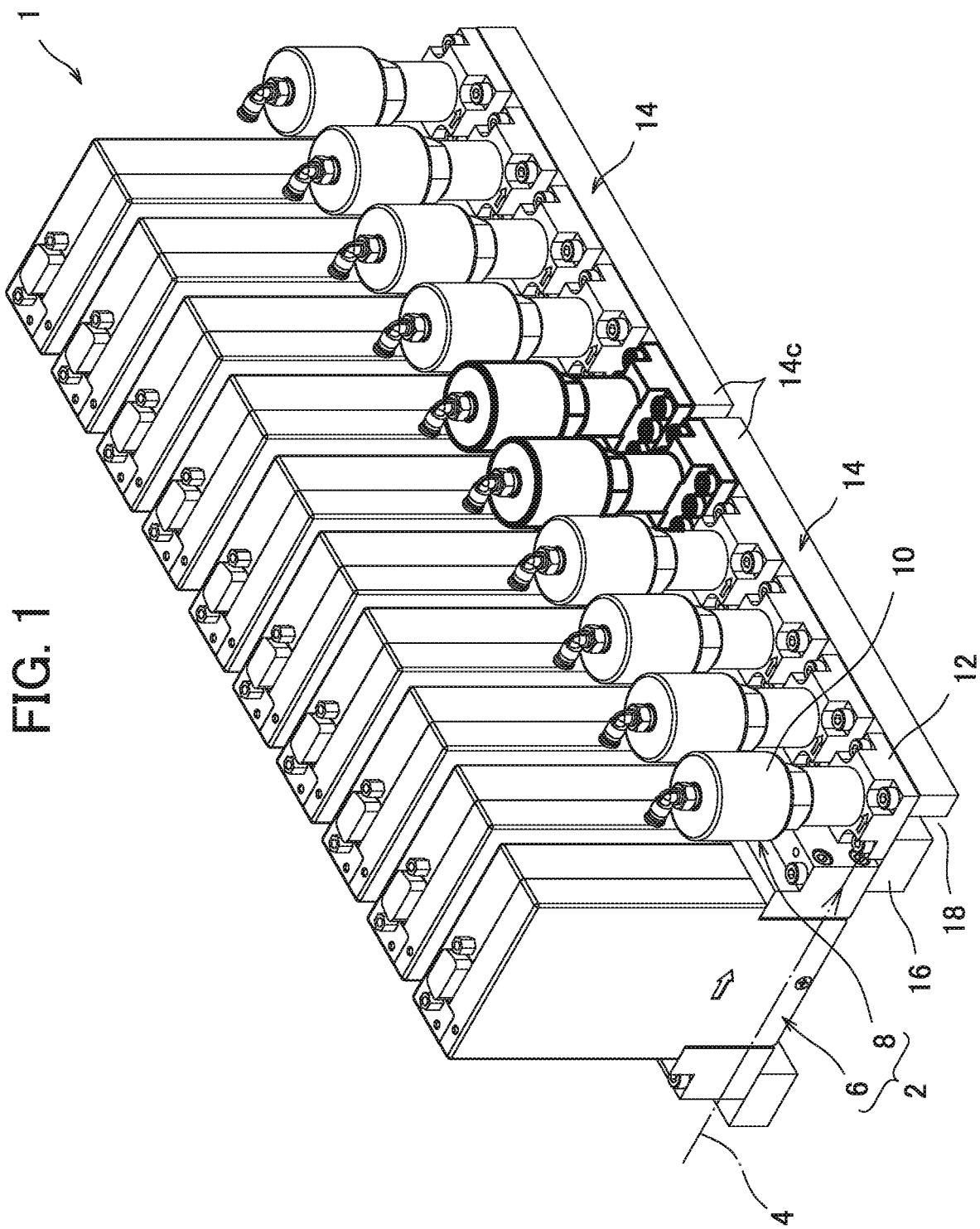
FIG. 1 is a perspective view illustrating a part of a fluid supply system according to an embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

MODE FOR CARRYING OUT THE INVENTION

Hereinafter, a fluid supply system according to an embodiment of the present invention will be described on the basis of drawings.

FIG. 1 illustrates a perspective view of a fluid supply system 1. The fluid supply system 1 is configured such that a plurality of fluid lines 4 with fluid control devices 2 connected in series are arranged and is used as a gas supply system for a semiconductor manufacturing device, for example. Note that the following drawings will be described with definitions that the fluid lines 4 extend in an extension direction X and are arranged in an arrangement direction Y that substantially perpendicularly intersects the extension direction X and a direction that substantially perpendicularly intersects both the extension direction X and the arrangement direction Y is an intersecting direction Z.

Each fluid control device 2 includes a flow amount control device 6 and an opening/closing valve 8 in order in a flowing direction of a fluid in each fluid line 4 represented by the arrow. The opening/closing valve 8 includes an actuator 10 and a body 12, and both ends of the body 12 in the extension direction X are fastened and secured to a multiple-unit manifold 14 and a block joint 16 with bolts. A clearance 18 is formed between the multiple-unit manifold 14 and the block joint 16. Note that other devices related to fluid control such as a regulator, which is not illustrated, may be provided at the fluid line 4.

The multiple-unit manifold 14 is, for example, a five-unit manifold to which five fluid lines 4 are connected. Also, the fluid supply system 1 in FIG. 1 is configured of two multiple-unit manifolds 14 disposed in series in the arrangement direction Y of the fluid lines 4. Flow passages, which are not illustrated, are formed in the block joint 16, and the flow passages communicate with the flow amount control devices 6 and the opening/closing valves 8 and form a part of the fluid lines 4. Note that the number of fluid lines 4 is not limited to five, it is only necessary that a plurality of fluid lines 4 are connected to each multiple-unit manifold 14, and the multiple-unit manifold 14 may be a multiple-unit manifold including 8 units, 16 units, or the like. Also, the number of multiple-unit manifolds 14 is not limited to two, and three or more multiple-unit manifolds 14 may be disposed in the arrangement direction Y.

Figure 2:
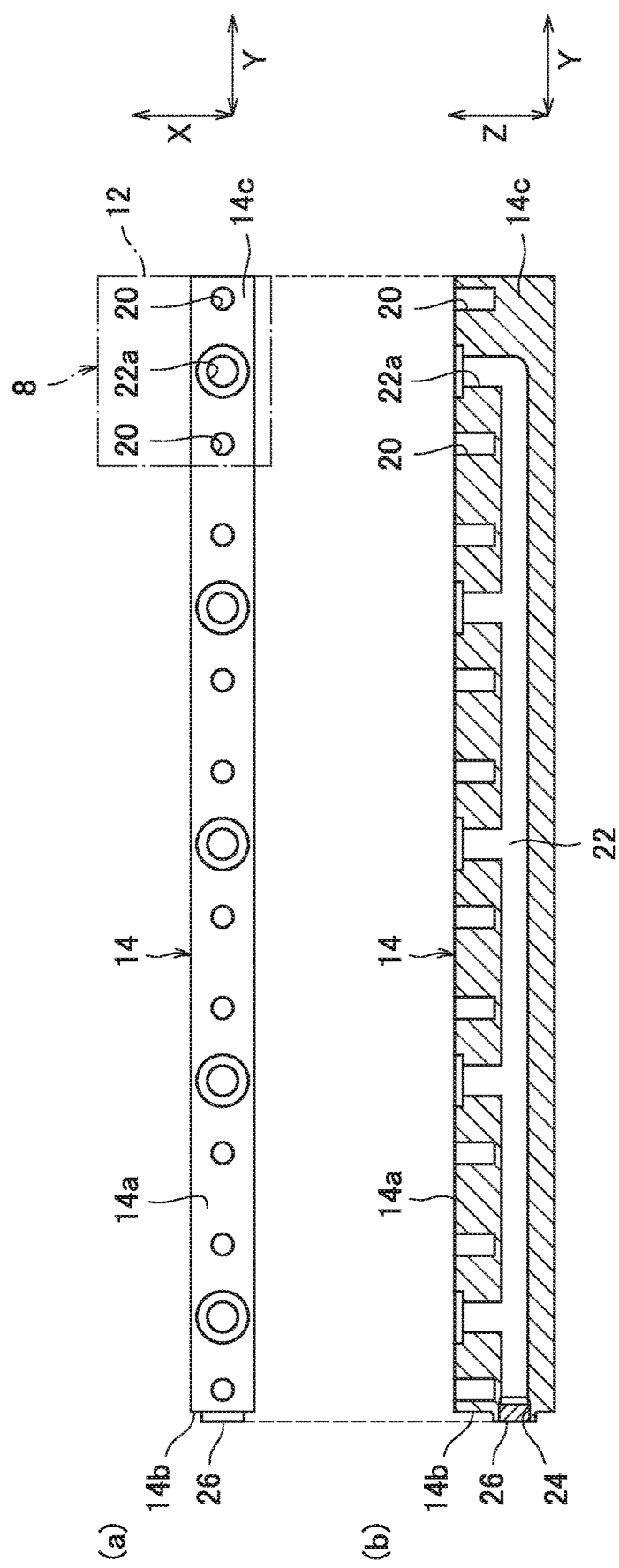
FIG. 2 is (a) a top view and (b) a sectional view of a multiple-unit manifold.

FIG. 2 illustrates (a) a top view and (b) a sectional view of each multiple-unit manifold 14. Note that the up-down direction is defined with reference to the posture of the fluid supply system 1 illustrated in FIG. 1, and the same applies to each of the following drawings. Ten bolt fastening holes 20 for installing five opening/closing valves 8 and five branched passages 22a for causing the opening/closing valves 8 to communicate with the combined flow passage 22 are opened in an upper surface 14a of each multiple-unit manifold 14.

One end side of the body 12 of each opening/closing valve 8 in the extension direction X is fastened to each bolt fastening hole 20. The combined flow passage 22 extends in the arrangement direction Y inside the multiple-unit manifold 14. The branched passages 22a are opened in the upper surface 14a from the combined flow passage 22 at installation locations of the opening/closing valve 8. A machined hole 24 after a drill or the like is inserted at the time of forming the combined flow passage 22 is formed in an end surface 14b of the multiple-unit manifold 14 on one side. The machined hole 24 is tightly closed through screwing or the like of a cap member 26.

Here, the two opening/closing valves 8 illustrated by the thick lines in FIG. 1 are three-way valves and are provided at mutually facing end portions 14c of the multiple-unit manifolds 14 that are adjacent to each other.

Figure 3:
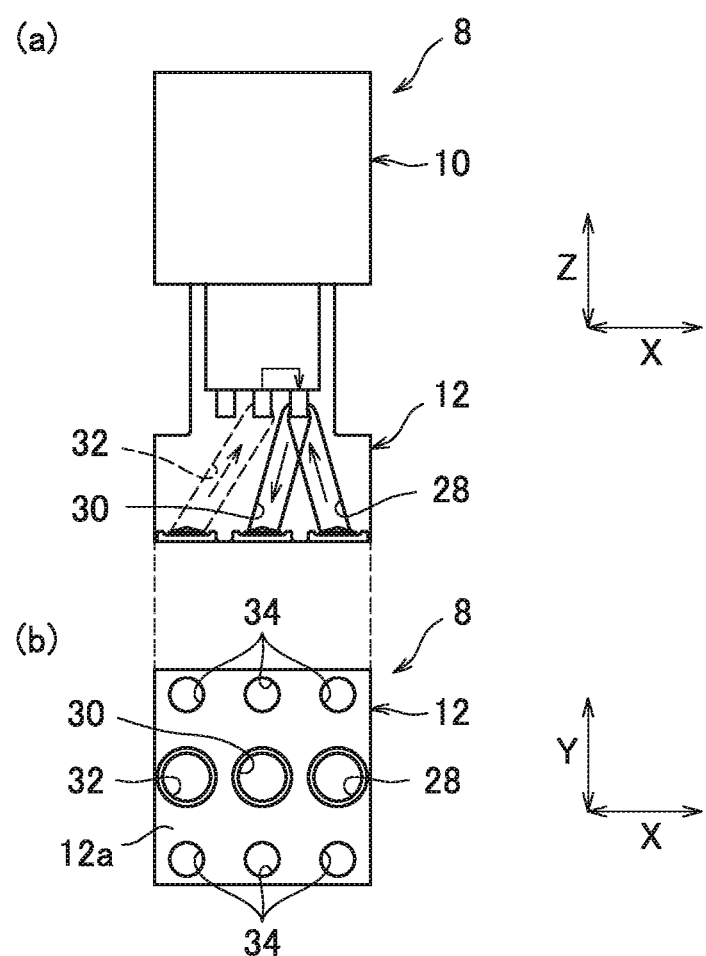
FIG. 3 is (a) a structure diagram and (b) a bottom view of an opening/closing valve.

FIG. 3 illustrates (a) a structure diagram and (b) a bottom view of each opening/closing valve 8 that is a three-way valve. The opening/closing valve 8 at each end portion 14c is configured to be able to open a third flow passage 32 in response to switching performed by the actuator 10 while first and second flow passages 28 and 30 are kept constantly opened as illustrated by the solid lines in FIG. 3(a).

As illustrated in FIG. 3(b), the first to third flow passages 28, 30, and 32 and six bolt insertion holes 34 are opened in a lower surface 12a of the body 12 abutting on the upper surface 14a of the multiple-unit manifold 14. Bolts are inserted into the two bolt insertion holes 34 formed in the body 12 on the right end side in FIG. 3(b) and are fastened to the bolt fastening holes 20 in the multiple-unit manifold 14 illustrated in FIG. 2. In this manner, the opening/closing valve 8 is connected and secured to the multiple-unit manifold 14, and the first flow passage 28 of the opening/closing valve 8 is caused to communicate with the branched passage 22a of the multiple-unit manifold 14.

Figure 4:
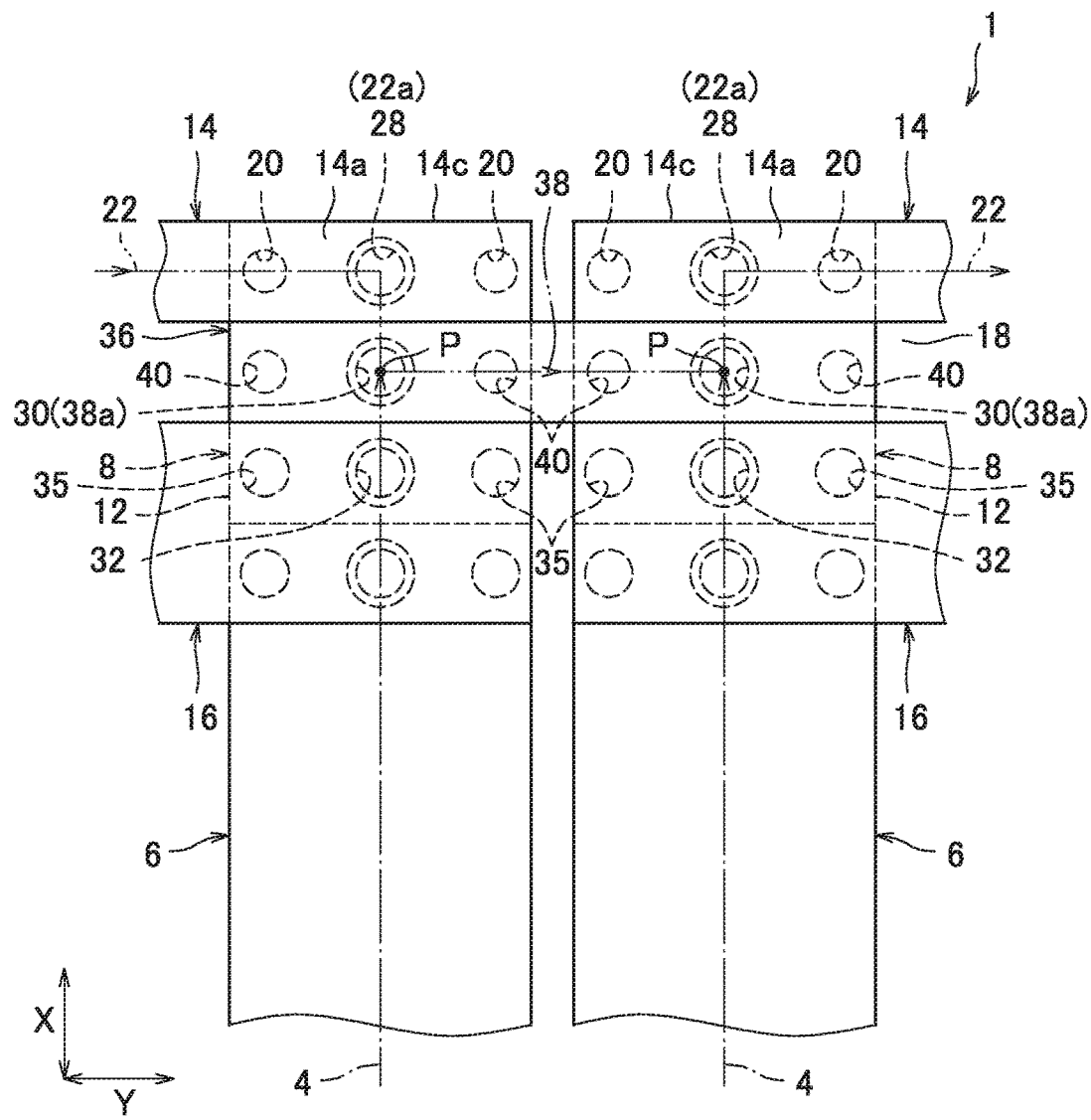
FIG. 4 is a top view illustrating the vicinity of mutually facing end portions of multiple-unit manifolds that are adjacent to each other.

Also, bolts are inserted into the two bolt insertion holes 34 formed in the body 12 on the left end side in FIG. 3(b) and are fastened to the bolt fastening holes 35 in the block joint 16, which is illustrated in FIG. 4. In this manner, the opening/closing valve 8 is secured to the block joint 16, and the third flow passage 32 of the opening/closing valve 8 is caused to communicate with the flow passage in the block joint 16. Note that the opening/closing valves 8 other than the two opening/closing valves 8 provided at the end portions 14c of the multiple-unit manifolds 14 may be three-way valves as described above or may be two-way valves in accordance with a specification of the fluid supply system 1.

FIG. 4 illustrates a top view in the vicinity of the end portions 14c of the multiple-unit manifolds 14. Note that only the lower surfaces 12a of the bodies 12 of the opening/closing valves 8 are illustrated by dashed lines in FIG. 4.

In the fluid supply system 1 according to the present embodiment, a coupling manifold 36 is disposed in parallel in the extension direction X to the mutually facing end portions 14c of the multiple-unit manifolds 14 that are adjacent to each other. Since the coupling manifold 36 is disposed in the clearance 18 illustrated in FIG. 1 between the multiple-unit manifolds 14 and the block joint 16, there is no need to provide a new space to install the coupling manifold 36.

Figure 5:
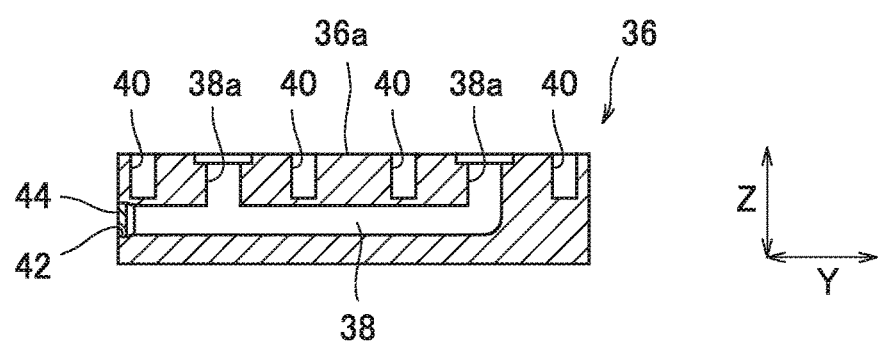
FIG. 5 is a sectional view of a coupling manifold.

FIG. 5 illustrates a sectional view of the coupling manifold 36. The coupling manifold 36 is, for example, a two-unit manifold, and includes a communication passage 38 extending in the arrangement direction Y, two branched passages 38a branched from the communication passage 38 and opened in an upper surface 36a of the coupling manifold 36, four bolt fastening holes 40, a machined hole 42 formed at the time of machining of the communication passage 38, and a cap member 44 that tightly closes the machined hole 42.

For the opening/closing valve (first fluid control device) 8 illustrated on the left side in FIG. 4, bolts are inserted into two bolt insertion holes 34 formed at the center of the body 12 and are fastened to bolt fastening holes 40 in the coupling manifold 36. In other words, the opening/closing valve 8 on the left side connects, to the coupling manifold 36, the end portion 14c of the multiple-unit manifold 14 on the left side out of the multiple-unit manifolds 14 that are adjacent to each other. Further, the second flow passage 30 of the opening/closing valve 8 on the left side is caused to communicate with the branched passage 38a of the coupling manifold 36 on the left side.

On the other hand, for the opening/closing valve (second fluid control device) 8 illustrated on the right side in FIG. 4, bolts are also inserted into two bolt insertion holes formed at the center of the body and are fastened to bolt fastening holes 40 in the coupling manifold 36. In other words, the opening/closing valve 8 on the right side connects, to the coupling manifold 36, the end portion 14c of the multiple-unit manifold 14 on the right side out of the multiple-unit manifolds 14 that are adjacent to each other. Further, the second flow passage 30 of the opening/closing valve 8 on the right side is caused to communicate with the branched passage 38a of the coupling manifold 36 on the right side.

Moreover, the combined flow passages 22 of the multiple-unit manifolds 14 that are adjacent to each other are caused to communicate with each other with the communication passage 38 of the coupling manifold 36 via the two opening/closing valves 8 illustrated in FIG. 4. Specifically, each of the opening/closing valves 8 has a structure in which the first and second flow passages 28 and 30 constantly communicate with each other. In this manner, the combined flow passage 22 in the multiple-unit manifold 14 on the left side is caused to communicate with the first flow passage 28 of the opening/closing valve 8 on the left side from the branched passage 22a.

Moreover, the first flow passage 28 is caused to communicate with the second flow passage 30 inside the body 12 of the opening/closing valve 8 on the left side, and further, the second flow passage 30 is caused to communicate with the communication passage 38 via the branched passage 38a of the coupling manifold 36 on the left side. Further, the communication passage 38 is caused to communicate with the branched passage 38a of the multiple-unit manifold 14 on the right side from the branched passage 38a on the right side. Further, communication is established from the branched passage 38a of the multiple-unit manifold 14 on the right side to the second flow passage 30 of the opening/closing valve 8 on the right side. Further, the second flow passage 30 is caused to communicate with the first flow passage 28 inside the body 12 of the opening/closing valve 8 on the right side, and also, the first flow passage 28 is caused to communicate with the combined flow passage 22 via the branched passage 22a of the multiple-unit manifold 14 on the right side.

In this manner, the combined flow passages 22 in the multiple-unit manifolds 14 that are adjacent to each other are constantly caused to communicate with each other via the coupling manifold 36 and the two opening/closing valves 8 as illustrated by the two-dotted chain line arrows in FIG. 4, and it is possible to use the two multiple-unit manifolds 14 as if the two multiple-unit manifolds 14 were a single continuous multiple-unit manifold.

Further, it is possible to realize a so-called continuous multiple-unit manifold, which is highly integrated, to which more fluid lines can be connected, while curbing generation of particles with a simple configuration in which the coupling manifold 36 is installed at the existing clearance 18 between the multiple-unit manifolds 14 and the block joint 16 in the fluid supply system 1 and the two existing opening/closing valves 8 at the end portions 14c are simply changed to three-way valves.

On the other hand, it is also possible to cause the combined flow passages 22 of the multiple-unit manifolds 14 that are adjacent to each other to communicate with the fluid lines 4 by switching the opening/closing valves 8 to a position at which the third flow passage 32 is opened by the actuator 10. Specifically, communication is established such that the fluid lines 4 illustrated by the one-dotted chain line arrows can join the communication passage 38 in the coupling manifold 36 at joining points P illustrated in FIG. 4. It is thus possible to connect the fluid lines 4 at the end portions 14c of the two multiple-unit manifolds 14 as well similarly to other parts of the multiple-unit manifolds 14, and to supply the fluid from the fluid lines 4 to the combined flow passages 22 illustrated by the two-dotted chain line arrows in FIG. 4.

As described above, according to the fluid supply system 1 in the present embodiment, the coupling manifold 36 is disposed in parallel to the mutually facing end portions 14c of the multiple-unit manifolds 14 that are adjacent to each other, the mutually facing end portions 14 of the multiple-unit manifolds 14 that are adjacent to each other and the coupling manifold 36 are connected by the opening/closing valves 8, and the combined flow passages 22 of the multiple-unit manifolds 14 that are adjacent to each other are caused to communicate with each other with the communication passage 38 in the coupling manifold 36 via the opening/closing valves 8. It is thus possible to dispose the plurality of multiple-unit manifolds 14 in series to achieve high integration, to curb generation of particles, and thereby to enhance reliability of the fluid supply system 1.

Also, since there is no need to connect the multiple-unit manifolds 14 that are adjacent to each other with short pipes or the like, waste spaces due to the short pipes or the like are excluded, and it is possible to further promote integration of the fluid supply system 1.

Also, it is possible to easily realize functions of the multiple-unit manifolds 14 including a large number of units, for example, the multiple unit manifolds including sixteen units or twenty four units, the manufacturing of which is difficult, by coupling the multiple-unit manifolds 14 that are adjacent to each other with the coupling manifold 36, and it is thus possible to reduce production costs of the fluid supply system 1.

Also, the block joint 16 is disposed separately from the multiple-unit manifolds 14 that are adjacent to each other with the clearance 18 therebetween in the extension direction X, and the coupling manifold 36 is disposed in the clearance 18. In this manner, since there is no need to provide a new space to install the coupling manifold 36, it is possible to further promote integration of the fluid supply system 1.

Although the embodiment of the present invention has been described hitherto, the present invention is not limited to the aforementioned embodiment, and various modifications can be made without departing from the gist of the present invention.

For example, the fluid supply system 1 can be applied not only to the gas supply system for a semiconductor manufacturing device but also a fluid supply system for a liquid and can also be used for various processes other than the semiconductor manufacturing process.

| Explanation of Reference Signs | |
|---|---|
| 1 | Fluid supply system |
| 4 | Fluid line |
| 8 | Opening/closing valve (first fluid control device, second fluid control device, three-way valve) |
| 14 | Multiple-unit manifold |
| 14c | End portion |
| 16 | Block joint |
| 18 | Clearance |
| 22 | Combined flow passage |
| 28 | First flow passage |
| 30 | Second flow passage |
| 32 | Third flow passage |
| 36 | Coupling manifold |
| 38 | Communication passage |
| X | Extension direction |
| Y | Arrangement direction |

The invention claimed is:

1. A fluid supply system in which a plurality of multiple-unit manifolds with a plurality of fluid lines connected are disposed in series in an arrangement direction of fluid lines, the fluid supply system comprising: a coupling manifold disposed in parallel to mutually facing end portions of the multiple-unit manifolds that are adjacent to each other; a first fluid control device connecting one of the end portions of the multiple-unit manifolds that are adjacent to each other to the coupling manifold; a second fluid control device connecting the other one of the end portions of the multiple-unit manifolds that are adjacent to each other to the coupling manifolds; and a plurality of block joints, which are disposed with a clearance away from the multiple-unit manifolds that are adjacent to each other in an extension direction of the fluid lines, the block joints each having flow passages that form part of the plurality of fluid lines, and the first and second fluid control devices being connected to the block joints along with the multiple-unit manifolds and the coupling manifold, wherein the coupling manifold is disposed in the clearance, wherein the coupling manifold has a communication passage that establishes communication of combined flow passages of the multiple-unit manifolds that are adjacent to each other via the first and second fluid control devices, and wherein the combined flow passages of the multiple-unit manifolds and the communication passage of the coupling manifold are arranged in a physically parallel relationship.

2. The fluid supply system according to claim 1, wherein each of the first and second fluid control devices includes
   first and second flow passages caused to communicate with each of the combined flow passages of the multiple-unit manifolds that are adjacent to each other via the communication passage, and
   a third flow passage causing each of the fluid lines to communicate with each of the combined flow passages of the multiple-unit manifolds that are adjacent to each other.

3. The fluid supply system according to claim 2, wherein each of the first and second fluid control devices is a three-way valve that is able to open the third flow passage in response to switching while the first and second flow passages are kept constantly opened.

4. The fluid supply system according to claim 2, wherein the first, second, and third flow passages of at least one of the first and second fluid control devices are arranged relative to each other in a physically linear arrangement.

5. The fluid supply system according to claim 1 and further comprising:
   one or more mechanical fasteners that directly attach the coupling manifold to the multiple-unit manifold.

6. The fluid supply system according to claim 5, wherein the communication passage of the coupling manifold extends horizontally, and wherein the coupling manifold has fasteners holes that extend partially into the coupling manifold only to one side of the communication passage of the coupling manifold that faces the first and second fluid control devices.

7. A fluid supply system in which a plurality of multiple-unit manifolds with a plurality of fluid lines connected are disposed in series in an arrangement direction of the fluid lines, the fluid supply system comprising: a coupling manifold disposed in parallel to mutually facing end portions of the multiple-unit manifolds that are adjacent to each other; a first fluid control device connecting one of the end portions of the multiple-unit manifolds that are adjacent to each other to the coupling manifold; and a second fluid control device connecting the other one of the end portions of the multiple-unit manifolds that are adjacent to each other to the coupling manifolds, wherein the coupling manifold has a communication passage that establishes communication of combined flow passages of the multiple-unit manifolds that are adjacent to each other via the first and second fluid control devices, and wherein each of the first and second fluid control devices includes: first and second flow passages caused to communicate with each of the combined flow passages of the multiple-unit manifolds that are adjacent to each other via the communication passage, and a third flow passage causing each of the fluid lines to communicate with each of the combined flow passages of the multiple-unit manifolds that are adjacent to each other, wherein the first, second, and third flow passages have a physically linear arrangement relative to each other, and wherein the combined flow passages of the multiple-unit manifolds and the communication passage of the coupling manifold are arranged in a physically parallel relationship.

8. The fluid supply system according to claim 7 and further comprising: one or more mechanical fasteners that directly attach the coupling manifold to the multiple-unit manifold.

9. The fluid supply system according to claim 8, wherein the communication passage of the coupling manifold extends horizontally, and wherein the coupling manifold has fasteners holes that extend partially into the coupling manifold only to one side of the communication passage of the coupling manifold that faces the first and second fluid control devices.

* * * * *